United States Patent Office 3,323,382
Patented June 6, 1967

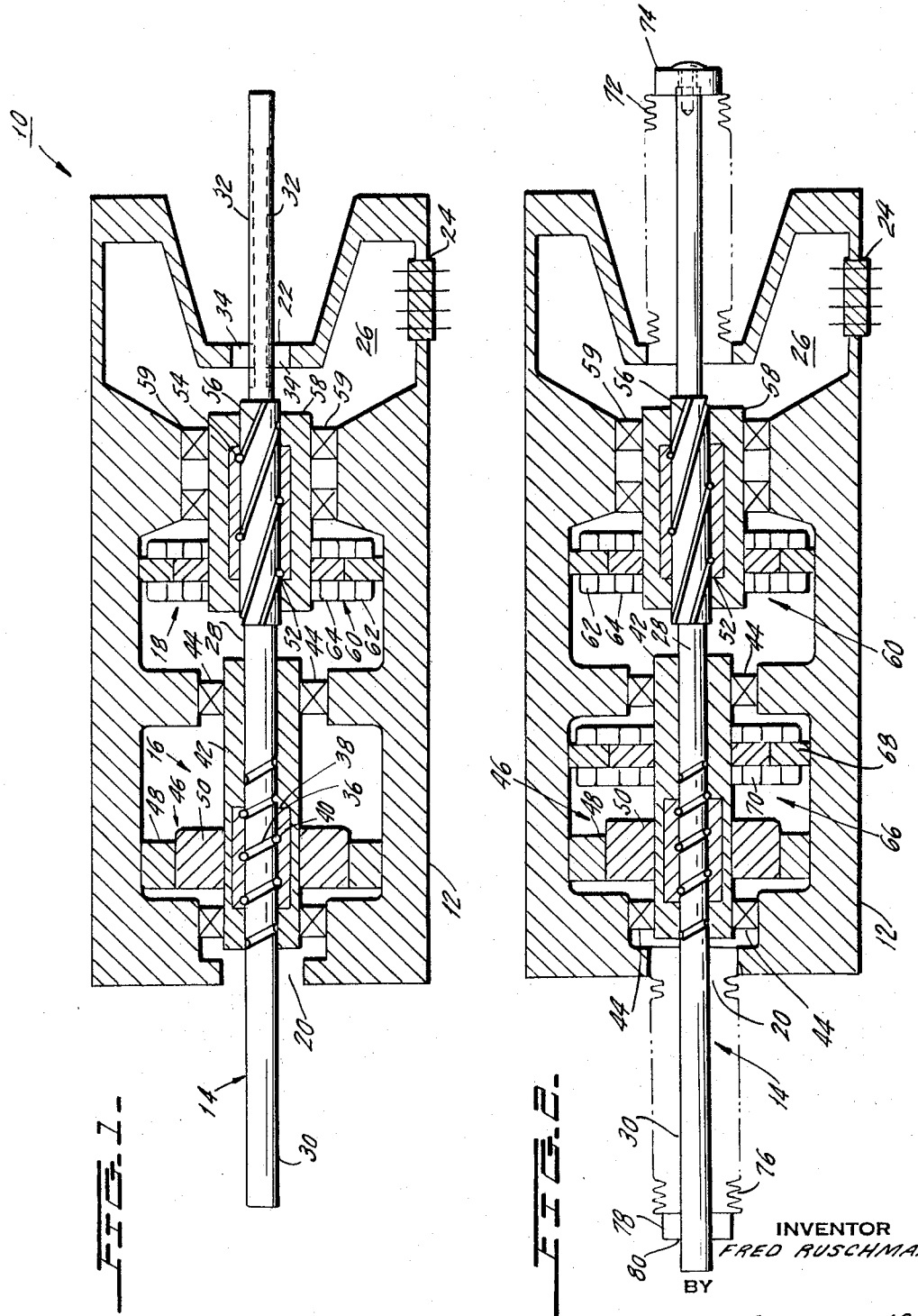

3,323,382
PRECISION LINEAR ACTUATOR
Fred Ruschmann, Port Washington, N.Y., assignor to Kollsman Instrument Corporation, Elmhurst, N.Y., a corporation of New York
Filed July 12, 1965, Ser. No. 471,055
15 Claims. (Cl. 74—127)

This invention relates to a device for producing precise linear movement and more particularly relates to a motion translating device which is capable of producing accurate linear motion in response to a rotary input.

For the solution of present day engineering problems, it has become increasingly important to develop high precision instruments which are capable of producing extremely accurate linear movement in response to rotary excitation. For example, if it is desired to produce accurate linear motion at some remote point, the customary procedure is to use an electrically or remotely controlled motor, the rotary output of which is translated to produce the desired linear motion.

A specific application wherein such rotary to linear motion translation is required occurs in space vehicles, such as satellites and capsules, wherein it may be necessary to produce accurate linear motion in response to activation of a small motor which may be controlled from the earth's surface or from within the space craft itself.

Such instruments must be highly accurate and furthermore should be designed from the viewpoint of both space saving and weight reduction criteria. From the standpoint of accuracy, such instruments must be capable of producing and repeating linear motion which may be accurately incremented by minute amounts and in furtherance thereof such instruments require that all moving parts be maintained within a constant volume environment whereby it is impossible for changes in pressure and atmospheric conditions to influence the sensitivity of the instrument.

Prior art instruments for accomplishing rotary to linear motion translation and for producing accurate measurement of the produced linear motion generally comprise a mechanical gear arrangement wherein the output shaft of an electric motor has a gear mounted thereon, such gear cooperating with the teeth of associated gearing to activate a geared rack, a slide and crank mechanism, or similar apparatus. The measurement of linear movement in such systems is normally accomplished by a readout system which again is dependent upon the interaction of similar cooperating gear arrangements.

Such gear arrangements suffer from serious disadvantages which decrease both the accuracy and desirability of such instruments. Specifically, the gear arrangements of the prior art require a relatively large number of parts, the multiplicity of which inherently detracts from the accuracy of the overall instrument. Secondly, the size and weight of such gears are diametrically opposed to the concepts of space and weight reduction which are of ever increasing importance in present design problems.

In contradistinction, the instant invention accomplishes the translation of rotary motion of an electric motor into precise linear movement without the use of complex gear arrangements which are prevalent in the prior art. The elimination of such gear arrangements materially increases the accuracy of the motion translation and furthermore reduces the overall weight and space required for such instrumentation.

Specifically, the instant invention accomplishes precise linear movement of an output shaft by providing that the rotor of an excitation motor be threadably linked to a first threaded portion of the output shaft. Rotation of the rotor of the electric motor causes direct linear movement of the output shaft thereby eliminating the need for any type of gear arrangement.

The readout or measurement of linear movement operates in the same manner as the drive mechanism except that it operates in the reverse sense. That is, the rotor of an associated output monitoring resolver is threadably linked to a second threaded portion of the output shaft whereby linear movement of the output shaft causes rotation of the resolver rotor which in turn produces signals representative of the linear movement of the output shaft.

As will be further explained, the instant invention may be easily modified to perform as a two-speed servo device to provide both a coarse and fine readout of the linear motion of the output shaft.

The instant invention further contemplates a novel hermetically sealed bellows arrangement which maintains the interior of the instrument at a constant volume and thus eliminates loading changes and possible subsequent variation in torque requirements due to pressure variations which might otherwise result from changes in the internal volume of the housing instrument. Furthermore, the bellows arrangement further serves the purpose of constraining the output shaft from rotating, thereby allowing only linear movement of the output shaft.

Accordingly, it is an object of the instant invention to provide a device for producing precise linear translatory motion which comprises a linearly movable output shaft, a driving arrangement operatively positioned about a first portion of the output shaft for translating a predetermined amount of rotation of the driving arrangement into a predetermined amount of linear motion of the output shaft, a driven arrangement operatively positioned about a second portion of the output shaft for translating an equal amount of linear motion of the output shaft into a predetermined amount of rotation of the driven arrangement, with the amount of rotation of the driven arrangement being different from the amount of rotation of the driving arrangement for the same amount of linear movement of the output shaft.

It is another object of the instant invention to provide a device for producing accurate linear translatory motion in a manner which eliminates the gear arrangements prevalent in the prior art.

Yet another object of the instant invention is to provide a device for producing accurate linear translatory motion which has relatively few moving parts, is relatively lightweight, and occupies a relatively small space.

Another object of the instant invention is to provide an accurate two-speed servo device for producing both coarse and fine readouts indicative of linear motion.

Still another object of the instant invention is to provide a device for producing accurate linear translatory motion, which device is hermetically sealed from external atmospheric conditions which may influence the sensitivity thereof.

Other objects and a fuller understanding of the instant invention may be had by referring to the accompanying specification and drawing, in which:

FIGURE 1 is a cross-sectional view of one embodiment of the instant invention; and FIGURE 2 is a cross-sectional view of an alternative embodiment of the instant invention.

Referring to FIGURE 1, there is shown a device 10 for producing accurate linear motion which includes generally four main components; a housing 12, an output shaft 14, a driving or input section 16 and a driven or readout section 18. The overall operation of the instrument may be described broadly as follows. Excitation of the input or driving section 16 produces linear movement of the output shaft 14, which in turn produces rotation of the driven or readout section 18 to provide an indication of the amount of linear movement of the output shaft 14.

The housing 12 is generally tubular in shape and includes openings 20 and 22 at opposite ends thereof for reception of the output shaft 14. Housing 12 further includes a lead-in connector 24 for passage of wiring from the exterior of the housing 12 to within the chamber defined generally by the reference character 26.

Output shaft 14 is seen to comprise a portion 28 located generally within the chamber 26 and a portion 30 extending through the opening 20 to the exterior of the housing 12. Linear movement of the exterior portion 30 of the output shaft 14 represents the desired output of the instant invention and may be coupled by suitable means to any mechanism which requires finely controlled linear motion. One end of internal shaft portion 28 is provided with two slotted key ways 32 which cooperate with keys 34 which extend within the opening 22 from the housing 12. The key and key way arrangement prevents rotation of the output shaft 14 thus allowing output shaft 14 to move freely in the linear direction only. Obviously any suitable type of spline or key way arrangement may perform the function of preventing rotation of the shaft 14.

The output shaft 14 is supported for linear motion within the housing 12 in a manner inherently associated with the input section 16 and readout section 18 to be presently described.

Output shaft 14 has a first threaded portion 36 about which is located a drive nut 38, which houses balls 40 which travel within the threads of threaded portion 36 to function to a ball bearing nut and leadscrew arrangement, which arrangement is well known in the art and forms no part of the instant invention. Fixedly secured to drive nut 38 for rotation therewith is a concentrically disposed tubular member 42 which is rotatably maintained within the housing 12 by means of suitable ball bearings 44. An electric motor 46 comprising a fixed stator 48 and rotatable rotor 50 is fixed within the housing 12, with the rotor 50 being secured to and rotatable with the tubular member 42.

Upon rotation of the rotor 50 in response to energization of the motor 46, the tubular member 42 and drive nut 38 will rotate, whereby the cooperation of balls 40 and the threads of threaded portion 36 produce linear motion of the output shaft 14. Because of the key and key way arrangement 32, 34, described above, output shaft 14 is prevented from rotation.

It will be appreciated that any suitable screw and nut arrangement may replace the ball bearing nut and leadscrew arrangement shown, the essential feature of the described arrangement being that the rotor 50 of the electric motor 46 is directly and operatively linked to the output shaft 14, thus eliminating the need for a relatively complex gear arrangement to transform the rotary motion of electric motor 46 into the linear motion of shaft 14.

The driven or readout section 18 of the instrument operates in the same manner as the input or driving mechanism, except that it operates in a reverse sense, that is, converting the produced linear motion of the output shaft 14 into rotary motion which may be monitored to provide an indication of the linear movement of the output shaft 14.

The driven or readout section 18 includes a driven nut 52 which houses balls 54 which travel in the threads of a second threaded portion 56 of the output shaft 14 to function as a ball bearing nut and leadscrew arrangement as described previously. Obviously any suitable screw and nut may replace such arrangement to provide a similar function. Secured to the driven nut 52 and rotatable therewith is a concentrically disposed tubular member 58 which is rotatably mounted within the housing 12 by means of suitable ball bearings 59. Concentrically located about tubular member 58 is a monitoring resolver 60 which includes a fixed stator 62 and a rotor 64 which is secured to the tubular member 58 for rotation therewith.

The resolver 60 is similar to the electric motor 46 but operates in a reverse sense. That is, rotation of the rotor 64 produces a signal in the stator 62 which is representative of the amount of rotation of the rotor.

Readout section 18 functions to provide an accurate indication of the linear movement of the output shaft 14 as follows. Cooperation of the balls 54 and threaded portion 56 in response to linear movement of the output shaft 14 produces rotation of the driven nut 52 and tubular member 58. Rotor 64, being secured for rotation to the tubular member 58, also rotates and produces a signal in the stator 62, which signal may be monitored to provide an indication of the linear movement of the shaft 14.

Resolvers available today are capable of achieving extremely accurate measurements. For example, there are resolvers which may detect increments as small as 6 minutes, and thus assuming that threaded portion 56 of output shaft 14 has a pitch of one thread per inch, such a resolver would provide readings corresponding to a linear displacement of .00028 of an inch (i.e., 6 minutes equals $\frac{1}{3600}$ of a revolution; equals $\frac{1}{3600}$ of an inch in the case of one thread per inch). Obviously, the pitch of threaded portion 56 may be decreased to provide much more accurate readings if desired.

It should be noted that the resolver 60 illustrated and discussed herein is exemplary only and may be substituted for by many available resolvers in the art, for example, a rotary optical encoder, an analog or digital rotary readout device, or, for that matter, a pancake type of rotating disc or drum the periphery of which may be marked and visually observed passing by a window provided in the housing 12.

Referring to FIGURE 2, there is shown a two-speed servo device, which device represents an alternative embodiment of the invention shown in FIGURE 1. As will be apparent, the instrument of FIGURE 2 is similar to that shown in FIGURE 1 and consequently like numbers have been used to designate like elements. Operation of the instrument 10 is similar to that which has been described with respect to FIGURE 1, and therefore a detailed explanation will not be repeated. It is sufficient to note that upon rotation of the rotor 50 of electric motor 46, output shaft 14 is caused to be moved linearly which in turn causes rotation of driven nut 52, tubular member 58 and rotor 64 of resolver 60. As previously noted, the output of resolver 60 may then be monitored to provide an indication of the amount of linear motion of the output shaft 14.

It can be seen in FIGURE 2 that the instrument 10 has been provided with an additional resolver 66 comprising a fixed stator 68 and rotor 70 rotatable relative thereto. Rotor 70 is secured to tubular member 42 for rotation therewith, and upon rotation will produce a signal in stator 68 which may be monitored to provide a second signal representative of the linear movement of output shaft 14. As may be seen in FIGURES 1 and 2, threaded portion 36 of output shaft 14 has a smaller pitch (or more threads per inch) than threaded portion 56 of output shaft 14. Thus if threaded portion 36 should have a pitch of a quarter inch or four threads per inch, resolver 66, if accurate to 6 minutes, would produce incremental readings of .00007 of an inch (i.e., 6 minutes equals $\frac{1}{3600}$ of a revolution, equals $\frac{1}{3600}$ of a quarter inch, equals .00007 inch).

It is now apparent that the linear actuator of FIGURE 2 can be used as a two-speed servo device with resolver 60 providing a coarse readout (accurate to .00028 inch, for the resolver and pitch chosen as exemplary) and resolver 66 providing a fine readout (accurate to .00007 inch). Since rotor 70 of resolver 66 will pass through four revolutions for every one revolution of rotor 64 of resolver 60 (for the 1:4 pitch relationship chosen), then each revolution of resolver rotor 70 corresponds to one quarter of a revolution of resolver rotor 64. Thus the coarse readout in increments of .00028 of an inch will function as a follower and identify the particular quarter inch revolution through which rotor 70 is passing in increments of .00007 inch.

It will be apparent that the numerical examples used above are for the purpose of illustration only and that the pitch relationships and resolvers chosen may be varied to produce much finer accuracy than that achieved above.

A second feature shown in FIGURE 2 is the novel bellows arrangement comprising bellows 72 and cap 74 at one end of the housing 12 and bellows 76 and cap 78 at the opposite end of housing 12. Bellows 72 is hermetically sealed at one end to the housing 12 and at the other end to cap 74. ellows 76 is hermetically sealed at one of its ends to the housing 12 and at the other end to cap 78, which cap is provided with an aperture 80 through which the external portion 30 of the output shaft 14 may hermetically pass. The bellows enclosure feature permits the operation of the linear actuator of the instant invention in a vacuum or under contaminated or explosive atmospheric conditions, and furthermore permits the chamber 26 of the housing 12 to remain at constant volume even during linear movement of the output shaft 14. This feature not only protects the mechanism from atmospheric conditions, but also eliminates loading changes due to pressure variations which would otherwise result from any change in housing volume. Furthermore, the interconnection of the output shaft 14 through the bellows 72 and 76 directly to the housing 12 serves the purpose of constraining the rotation of output shaft 14, and thus eliminates the need for the key and key way arrangement 34 and 32, respectively, shown in FIGURE 1.

There has thus been described a linear actuator which produces accurate linear motion while eliminating the need for complex gear arrangements which are less accurate and require greater space and weight. The instant invention further contemplates a two-speed servo system which affords precise positioning possiiblities by use of both a coarse and fine readout system. Furthermore, a novel bellows arrangement protects the interior of the instant invention from atmospheric conditions, retains the interior of the device at a constant volume, and prevents rotation of the output shaft of the device.

Although I have described my invention with a certain degree of particularity, it is understood that the present disclosure has been made only by way of example and that numerous changes in details of construction in the combination and arrangement of parts may be resorted to without departing from the scope of the invention as hereinafter claimed.

What is claimed is:

1. A device for producing precise linear translatory motion comprising:
   a linearly movable output shaft;
   driving means operatively positioned about a first portion of said output shaft for translating a predetermined amount of rotation of said driving means into a predetermined amount of linear motion of said output shaft;
   driven means operatively positioned about a second portion of said output shaft for translating said predetermined amount of linear motion of said output shaft into a predetermined amount of rotation of said driven means;
   said predetermined amount of rotation of said driven means being different than said predetermined amount of rotation of said driving means.

2. The device of claim 1, and further including readout means responsive to rotation of said driven means for providing an indication of the amount of linear movement of said output shaft.

3. A device for producing precise linear translatory motion comprising:
   a linearly movable output shaft;
   driving means operatively positioned about a first portion of said output shaft for translating a predetermined amount of rotation of said driving means into a predetermined amount of linear motion of said output shaft;
   first readout means responsive to rotation of said driving means for providing a first indication of the amount of linear movement of said output shaft;
   driven means operatively positioned about a second portion of said output shaft for translating said predetermined amount of linear motion of said output shaft into a predetermined amount of rotation of said driven means;
   said predetermined amount of rotation of said driven means being different than said predetermined amount of rotation of said driving means; and
   second readout means responsive to rotation of said driven means for providing a second indication of the amount of linear movement of said output shaft.

4. The device of claim 3, and further including:
   a housing having an internal chamber therein, said driving means, said driven means, said first and second readout means, and an internal portion of said output shaft being located within said chamber, an external portion of said output shaft extending outside of said chamber;
   first bellows means hermetically sealed to said housing and to said external portion of said output shaft;
   second bellows means hermetically sealed to said housing and to said internal portion of said output shaft;
   cooperation of said output shaft, first and second bellows means, and said housing maintaining a constant volume within said chamber and further preventing rotation of said output shaft.

5. A device for producing precise linear translatory motion comprising:
   a linearly movable output shaft;
   driving means threadably engaging a first threaded portion of said output shaft, said first threaded portion having a predetermined pitch;
   driven means threadably engaging a second threaded portion of said output shaft, said second threaded portion having a pitch which is different than the pitch of said first threaded portion;
   activation of said driving means effecting linear motion of said output shaft thereby effecting rotation of said driven means.

6. A device for producing precise linear translatory motion comprising:
   a linearly movable output shaft, said shaft having first and second threaded portions, said first threaded portion having a pitch which is different than the pitch of said second threaded portion;
   driving means threadably engaging said first threaded portion of said output shaft, rotation of said driving means causing linear movement of said output shaft;
   driven means threadably engaging said second threaded portion of said output shaft, linear movement of said output shaft causing rotation of said driven means; and
   readout means responsive to rotation of said driven means for producing an indication of the amount of linear movement of said output shaft.

7. The device of claim 6, and further including interlock means connected to said output shaft for preventing rotation of said output shaft.

8. The device of claim 6, and further including:
   a housing having an internal chamber therein, said driving means, said driven means, said readout means and an internal portion of said output shaft being located within said chamber, an external portion of said output shaft extending outside of said chamber;
   first bellows means hermetically sealed to said housing and to said external portion of said output shaft;
   second bellows means hermetically sealed to said housing and to said internal portion of said output shaft;

cooperation of said first and second bellows means, said output shaft, and said housing maintaining a constant volume within said housing and further preventing rotation of said output shaft.

9. The device of claim 6, wherein said driving means comprises a motor having a stator and a rotor rotatably relative thereto, said rotor rotatably connected to said first threaded portion of said output shaft, rotation of said rotor relative to said stator producing linear movement of said output shaft.

10. The device of claim 9, and further including a driving nut located about said first threaded portion of said output shaft and secured to said rotor for rotation therewith, said driving nut having at least one ball bearing associated therewith, said ball bearing residing within the threads of said first threaded portion of said output shaft, rotation of said rotor causing rotation of said driving nut and said ball bearing thereby producing linear movement of said output shaft.

11. The device of claim 10, wherein said driven means includes a driven nut located about said second threaded portion of said output shaft, said driven nut having at least one ball bearing associated therewith, said ball bearing residing within the threads of said second threaded portion of said output shaft, linear movement of said output shaft causing rotation of said ball bearing thereby producing rotation of said driven nut.

12. The device of claim 11 wherein said readout means includes a resolver having a stator and rotor rotatable relative thereto, said rotor being secured to said driven nut for rotation therewith, rotation of said rotor in response to linear movement of said output shaft producing a signal in said stator representative of the linear movement of said output shaft.

13. A device for producing precise linear translatory motion comprising:
a linearly movable output shaft, said shaft having first and second threaded portions, said first threaded portion having a pitch which is different than the pitch of said second threaded portion;
driving means threadably engaging said first threaded portion of said output shaft, rotation of said driving means causing linear movement of said output shaft;
first readout means responsive to rotation of said driving means for providing a fine indication of the amount of linear movement of said output shaft;
driven means threadably engaging said second threaded portion of said output shaft, linear movement of said output shaft causing rotation of said driven means; and
second readout means responsive to rotation of said driven means for providing a coarse indication of the amount of linear movement of said output shaft.

14. The device of claim 13, and further including:
a housing having an internal chamber therein, said driving means, said driven means, said first and second readout means, and an internal portion of said output shaft being located within said chamber, an external portion of said output shaft extending outside of said chamber;
first bellows means hermetically sealed to said housing and to said external portion of said output shaft;
second bellows means hermetically sealed to said housing and to said internal portion of said output shaft;
cooperation of said first and second bellows means, said output shaft and said housing maintaining a constant volume within said housing and further preventing rotation of said output shaft.

15. The device of claim 14, wherein:
said driving means comprises a motor having a stator and a rotor rotatable relative thereto, a driving nut located about said first threaded portion of said output shaft and secured to said rotor for rotation therewith, said driving nut having at least one ball bearing associated therewith residing within the threads of said first threaded portion of said output shaft for translating rotary movement of said rotor into linear movement of said output shaft;
said driven means comprises a driven nut located about said second threaded portion of said output shaft, said driven nut having at least one ball bearing associated therewith residing within the threads of said second threaded portion of said output shaft for translating linear movement of said output shaft into rotary movement of said driven nut; and
said first and second readout means comprise first and second resolvers, respectively, each having a stator and a rotor rotatable relative thereto, said rotor of said first resolver being secured to said driven nut for rotation therewith, said rotor of said second resolver being secured to said driven nut for rotation therewith, rotation of said rotors in response to rotation of said driving and driven nuts, respectively, producing signals in said respective stators indicative of the linear movement of said output shaft.

References Cited

UNITED STATES PATENTS

| 260,366 | 7/1882 | Burr | 74—424.8 |
| 608,396 | 8/1898 | Wadman | 74—42 |
| 1,132,704 | 3/1915 | Coes | 33—166 |
| 2,902,885 | 9/1959 | Wright | 74—625 |
| 3,038,352 | 6/1962 | Murphy | 74—424.8 |
| 3,161,074 | 12/1964 | Korthaus et al. | 74—424.8 |

FRED C. MATTERN, JR., *Primary Examiner.*

W. S. RATLIFF, *Assistant Examiner.*